United States Patent
Schwaiger et al.

(10) Patent No.: US 6,280,172 B1
(45) Date of Patent: Aug. 28, 2001

(54) APPARATUS FOR THE EXTRUSION OF PLASTIC PIPES OR PROFILES

(75) Inventors: Meinhard Schwaiger, Linz; Franz Mayrhofer, Scharnstein, both of (AT)

(73) Assignee: Technoplast Kunststofftechnik GmbH, Micheldorf (AT)

( * ) Notice: Subject to any disclaimer, the term of this patent is extended or adjusted under 35 U.S.C. 154(b) by 0 days.

(21) Appl. No.: 09/407,952

(22) Filed: Sep. 28, 1999

(30) Foreign Application Priority Data

Sep. 29, 1998 (AT) .............................................. GM 633/98

(51) Int. Cl.[7] .................................................... B29C 47/08
(52) U.S. Cl. ...................... 425/186; 425/188; 425/192 R; 425/376.1; 425/392
(58) Field of Search .................................. 425/186, 190, 425/192 R, 392, 376.1, 188

(56) References Cited

U.S. PATENT DOCUMENTS

| | | | |
|---|---|---|---|
| 2,821,745 | * 2/1958 | Patton | 425/199 |
| 5,776,519 | * 7/1998 | Flammer | 425/188 |
| 5,888,557 | * 3/1999 | Houk | 425/186 |
| 6,126,430 | * 10/2000 | Coyle et al. | 425/188 |

* cited by examiner

Primary Examiner—Nam Nguyen
Assistant Examiner—Donald Heckenberg
(74) Attorney, Agent, or Firm—Dykema Gossett PLLC

(57) ABSTRACT

The present invention relates to an apparatus for the extrusion of plastic profiles with an extruder having an extruder flange, an extrusion die with a die flange through which the extrusion die is detachably connectable with the extruder flange, a fastening element with the two halves which is arranged to embrace the extruder flange and the die flange, a tensioning element in order to press the two halves of the fastening element against the flanges. An improved function is achieved in such a way that the two halves of the fastening element are fastened swivelably on the extruder and that they are mechanically coupled in order to perform an oppositely directed swiveling movement.

8 Claims, 3 Drawing Sheets

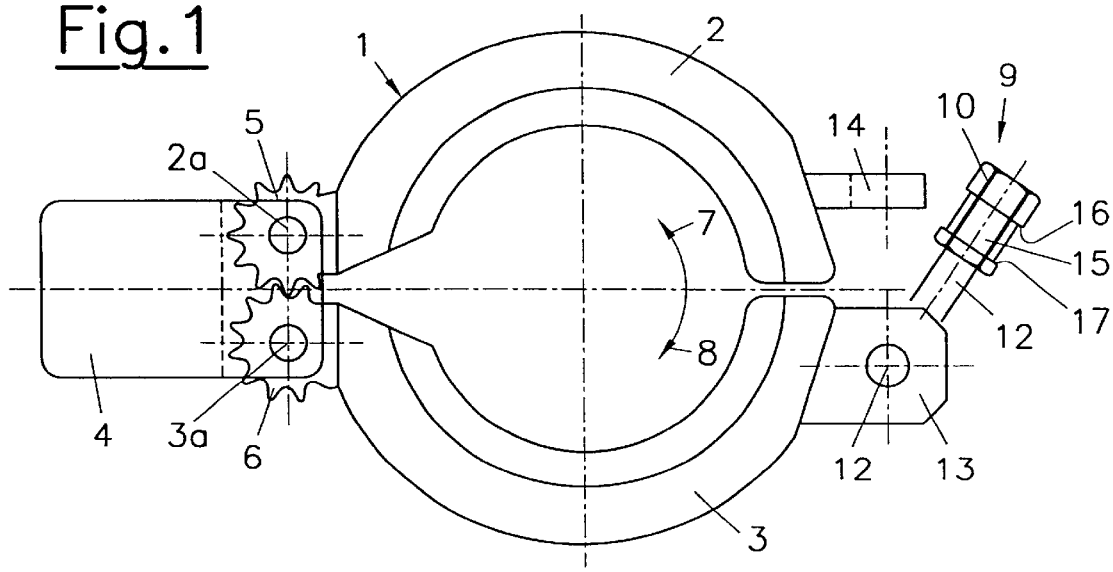
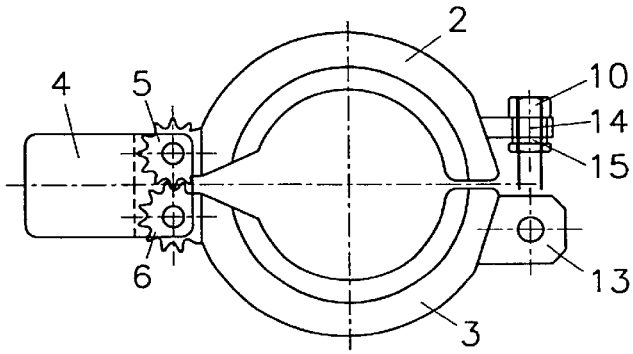
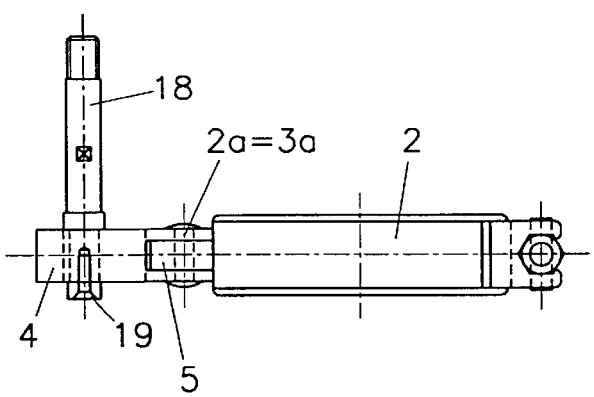

APPARATUS FOR THE EXTRUSION OF PLASTIC PIPES OR PROFILES

BACKGROUND OF THE INVENTION

The present invention relates to an apparatus for the extrusion of plastic pipes or profiles.

DESCRIPTION OF THE PRIOR ART

Extrusion apparatuses consist of the actual extruder in which a plastic granulate (or powder) is heated and is conveyed with the help of endless screws. An extrusion die is attached to such an extruder which brings the viscous plastic mass into the desired cross-sectional shape. Since a separate extrusion die is required for each shape of profile, it must be easily and rapidly exchangeable. A conventional flanged joint which is fastened with a plurality of screws comes with the disadvantage that the loosening and fastening of an extrusion die is time-consuming. As a result, so-called quick-change systems have become known in which the extruder flange and the die flange are embraced by a fastening element which presses the two flanges together. Conical seats are arranged on the rear sides of the two flanges to which correspond associated seats on the fastening element. In this way, a respective pressure can be exerted upon the two halves of the fastening element by means of a single tensioning element such as a screw for example, so that the same presses against the seat of the two flanges and then presses the two together. The fastening of an extrusion die can thus be considerably simplified in this manner. This disassembly of the extrusion die, however, is only possible in many cases under adverse conditions. In order to allow achieving respective pressing pressures between the two flanges, the seats must have a relatively flat angle of pressure. It is usually between 10° and 15°. The consequence of this is that the two halves of the fastening element must be separated from the flange under action of force after the loosening of the tensioning element. In day-to-day practice a hammer is used to beat on the fastening elements. This leads to an undesirable introduction of forces into the extruder. Moreover, the handling of the relatively heavy halves of the fastening element requires a considerable amount of effort and is therefore strenuous.

U.S. Pat. No. 3,632,279 shows a fastening apparatus for an extrusion die having two clamping members which can be tensioned by way of a lever arrangement. Although the tensioning is possible in an advantageous manner in this apparatus because the clamping members are self-centering, the release of the fixed clamping members is not substantially facilitated. Particularly in cases where one of the clamping members is fixed while the other is released, the lever arrangement will not contribute to helping the fixed clamping member to be released because any movement of the actuating lever is translated directly onto the already released clamping member. Moreover, the mobility of the clamping members is limited in the known solution by the lever arrangement.

SUMMARY OF THE INVENTION

It is the object of the present invention to reduce the set-up times in the extrusion of profiles by an improvement of the die fastening system and both to accelerate and facilitate the required work.

For this purpose it is provided for in accordance with the invention that the two halves of the fastening element are fastened swivelably to the extruder and that they are mechanically coupled in order to perform a restrained swiveling movement in opposite directions. The relevant aspect in the present invention is that as a result of the mechanical coupling of the two halves of the fastening element it is possible to achieve that the opening of one half also causes the opening of the other half. This means that the two halves only need to be pressed apart so as to achieve that the two halves detach from the flanges.

A particularly simple embodiment is obtained when a toothed gearing is provided as a mechanical coupling. In this respect it is particularly favorable when each of the two halves of the fastening element is integrally connected with a toothed wheel, which two toothed wheels are directly in mutual engagement. In this manner one can make do constructionally without additional components.

A particularly favorable introduction of force can be achieved in such a way that a screw is provided which is arranged so as to optionally press the two halves against one another or apart from one another. This means further that a single tensioning element is provided both for producing as well as for releasing the connection of the two flanges. A further improvement of the work flow is obtained when the screw is held captively and swivelably on one half of the fastening element. As an alternative, however, it is also possible to provide a pneumatically operating opening and closing apparatus.

In a particularly preferable embodiment of the present invention it is provided that the jointing plane of the two halves of the fastening element is arranged substantially horizontally. It is particularly preferable if the lower half of the fastening element is provided with a greater weight than the upper half of the fastening element. In this way it is achieved that the weight of the upper and the lower half of the fastening element approximately balance one another out. During the swiveling movement it is therefore only necessary to overcome the relatively low frictional resistance. When the lower half is provided with a slightly heavier arrangement than the upper half it is possible to achieve that the two halves have a slight tendency to move in the opened state and that they remain in the same without any influence of force.

BRIEF DESCRIPTION OF THE DRAWINGS

The invention is now explained in closer detail by reference to the embodiments shown in the drawings, wherein:

FIG. 1 shows a first embodiment of the present invention;

FIG. 2 shows a view according to FIG. 1 in the locked state on a reduced scale;

FIG. 3 shows a top view of an embodiment of FIGS. 1 and 2;

Figure 4:
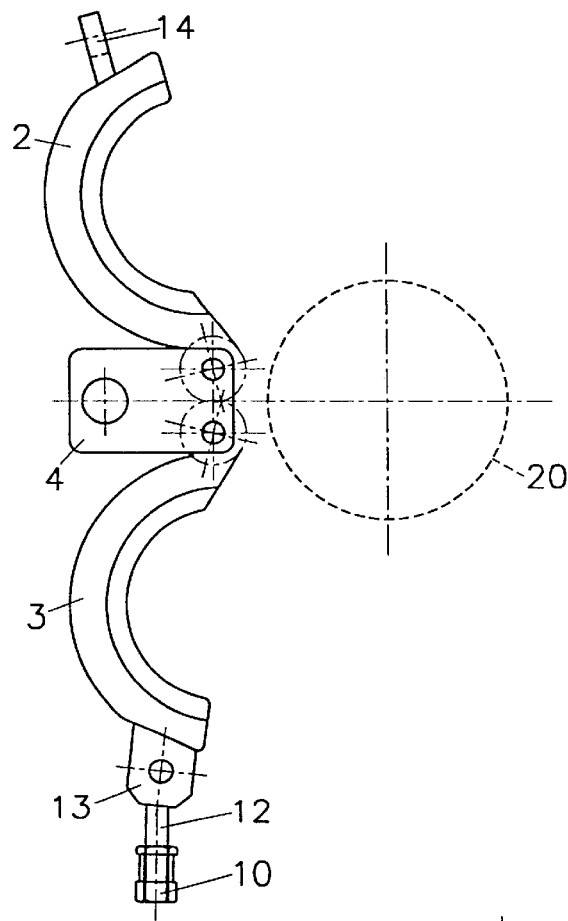
FIG. 4 shows a view in the opened state.

For the purpose of increasing the clarity, FIGS. 1 to 5 only show the fastening elements and the tensioning elements.

DETAILED DESCRIPTION OF THE PREFERRED EMBODIMENTS

The fastening element 1 of FIG. 1 consists of an upper half 2 and a lower half 3. The two halves 2 and 3 are attached, swivelably about pins 2a and 3a, on a mounting 4 which is connected with the extruder which is not shown otherwise in FIG. 1. The two halves 2, 3 are integrally connected with the toothed wheels 5, 6 in the zone of their swivel pins 2a, 3a. As the toothed wheels 5, 6 have the same size, it is achieved that the swiveling angle of the upper half 2 upwardly in the direction of the arrow 7 always corresponds to the swiveling angle of the lower half 3 downwardly in the direction of arrow 8. A tensioning element 9 is provided with a screw 10 as its most important element, which screw is attached swivelably about an pin 12 on a mounting 13. Mounting 13 is integrally connected with the lower half 3. In this way the screw 10 is captively connected with the lower half 3 of the fastening element 1. A fork-like mounting 13 is arranged integrally on the upper half 2 of the fastening element 1 for the engagement with screw 10. Screw 10 comprises a recess 15 of reduced diameter which is limited by an upper pressure shoulder 16 and a lower pressure shoulder 17.

FIG. 2 shows the locked state of the fastening element 1. The recess 15 of screw 10 is introduced into the fork-like mounting 14 of the upper half 2 and screw 10 is tightened in such a way that the upper pressure shoulder 16 presses from above on mounting 14. In this way the two halves 2, 3 of the fastening element 1 are pressed together in order to produce the required pressing force. The lower pressure shoulder 17 is used for releasing the fastening element 1 by pressing the two halves apart. Even if one of the halves is stuck harder than the other, the gear consisting of the toothed wheels 5, 6 ensure that the halves will detach evenly.

FIG. 3 shows the situation in a view from above. A fastening bolt 18 produces the connection of the mounting 4 with the extruder which is not shown otherwise. A screw 19 secures the connection of the mounting 4 with the fastening bolt 18.

FIG. 4 shows the situation in the opened state. The upper half 2 is upwardly swiveled away, whereas the lower half 3 is downwardly swiveled away. The lower half 3 is provided with a slightly heavier arrangement than the upper half 2, so that the position as shown in FIG. 4 is stable. The extruder flange is shown with the reference numeral 20 with the broken lines.

Figure 5:
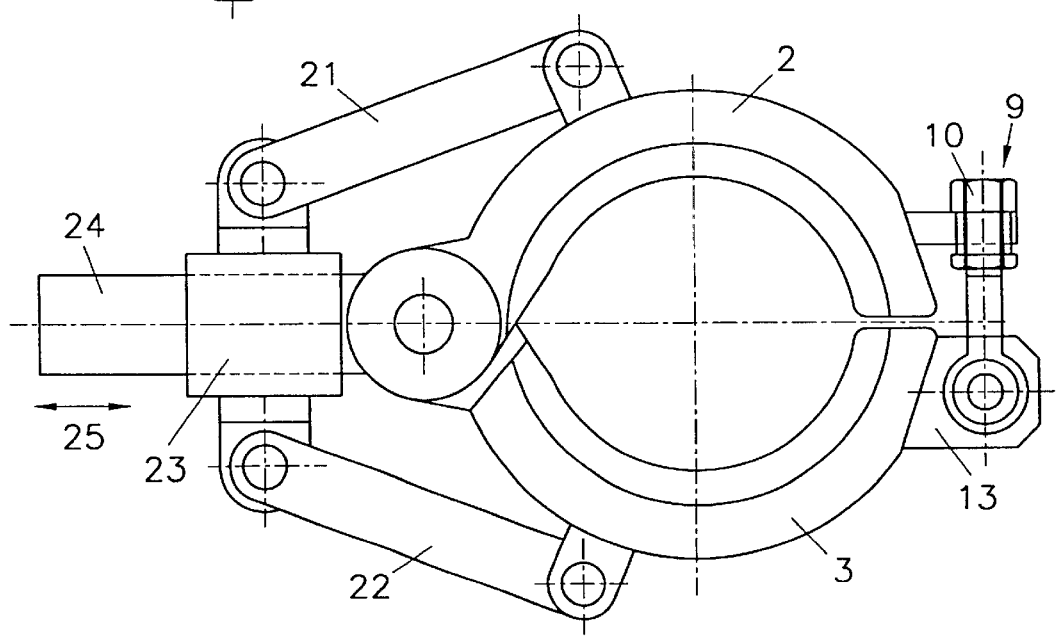
FIG. 5 shows a further embodiment of the present invention.

FIG. 5 shows an alternative embodiment of an apparatus in accordance with the invention. The upper half 2 and the lower half 3 of the fastening element 1 and the tensioning element 9 correspond substantially to the aforementioned embodiment. The difference is, however, that the opposite movement of the halves 2, 3 is not produced by toothed wheels, but by levers 21, 22 which are connected with the halves 2 and 3 in an articulated manner. Moreover, levers 21, 22 are connected with a sliding sleeve 23 which is movably held on a guide means 24 in the direction of the double arrow 25. In this way it is possible to transmit relatively large forces between the two halves 2 and 3.

Figure 6:
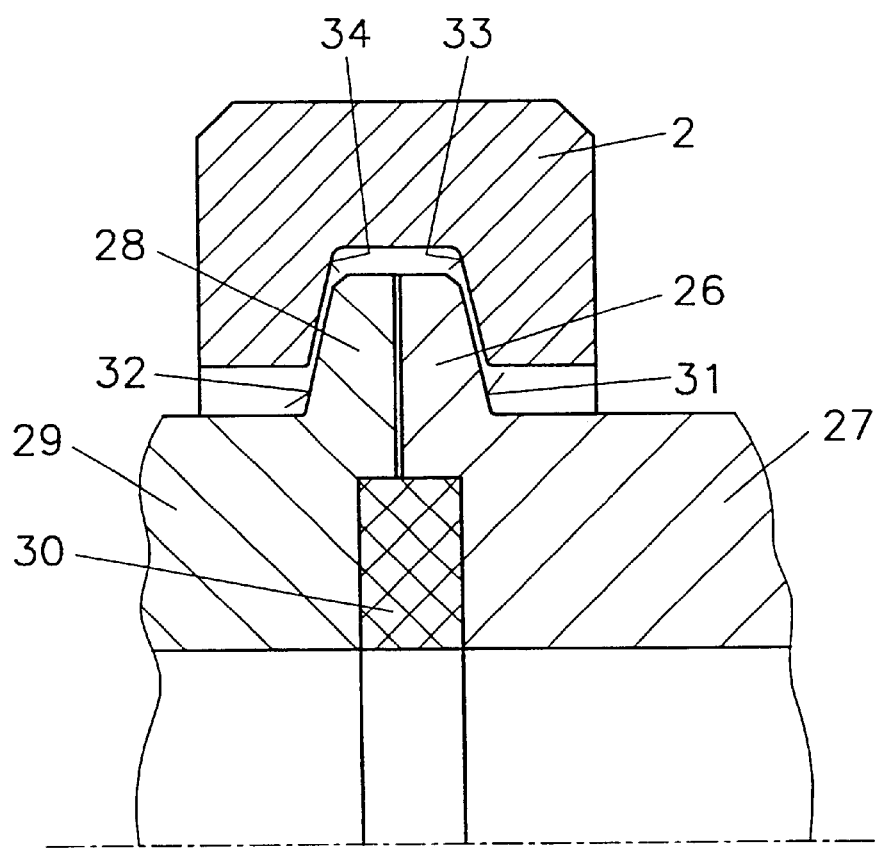
FIG. 6 shows a detail of an embodiment in accordance with the invention in a sectional view.

FIG. 6 shows a relevant section of the apparatus in accordance with the invention in a sectional view. An extruder flange 26 is provided on an extruder 27 which is represented only in an indicated illustration. A die flange 28 of an extrusion die 29, which is also only indicated, is adjacent to the extruder flange 26. A ring 30 causes the centering and the sealing between the flanges 26 and 28. The two flanges 26 and 28 are provided with conical seats 31 and 32. FIG. 6 shows the upper half 2 of the fastening element 1 which is provided with a substantially U-shaped cross section in order to embrace the two flanges 26, 28. Seats 33, 34 on the fastening element 1 are arranged so as to exert a pressure on seats 31, 32 on the flanges 26, 28 in order to press them together.

The apparatus in accordance with the invention allows connecting an extrusion die rapidly and securely with an extruder and removing the same with the same speed. The danger of damaging the die or extruder is considerably reduced.

We claim:

1. An apparatus for the extrusion of plastic pipes or profiles, comprising:

an extruder having an extruder flange;

an extrusion die having a die flange through which the extrusion die is detachably connectable with the extruder flange;

a fastening element having two halves which are arranged to embrace the extruder flange and the die flange and which are fastened swivelably on the extruder;

a tensioning element pressing the two halves of the fastening element against the flanges;

wherein a mechanical coupling of the two halves of the fastening element performs a restrained, oppositely directed, swiveling movement.

2. An apparatus as claimed in claim 1, wherein a toothed gearing is provided as a mechanical coupling.

3. An apparatus according to claim 2, wherein each of the two halves of the fastening element is integrally connected with a toothed wheel, which two toothed wheels are in direct mutual engagement.

4. An apparatus according to claim 1, wherein a screw is provided as a tensioning element which is arranged so as to optionally press the two halves against one another or apart from one another.

5. An apparatus according to claim 4, wherein the screw is captively held in a swivelable manner on one half of the fastening element.

6. An apparatus according to claim 4, wherein the screw is provided with an upper and a lower pressure shoulder between which is formed a recess in which a fork shaped mounting can engage which is fastened to a half of the fastening element.

7. An apparatus according to claim 1, wherein the jointing plane of two halves of the fastening element is arranged horizontally.

8. An apparatus according to claim 7, wherein the lower half of the fastening element is provided with a higher weight than the upper half of the fastening element.

* * * * *